United States Patent [19]

Smith

[11] 4,340,032
[45] Jul. 20, 1982

[54] SOLAR HEATING SYSTEM

[76] Inventor: James Smith, 2503 Prospect, Kansas City, Mo. 64127

[21] Appl. No.: 153,178

[22] Filed: May 27, 1980

[51] Int. Cl.³ .............................................. F24J 3/02
[52] U.S. Cl. .................................... 126/430; 126/425; 126/427; 126/429; 126/440; 126/400; 350/451
[58] Field of Search ............... 126/427, 430, 429, 436, 126/440, 438, 424, 400, 116 R, 121, 426; 165/104 S, DIG. 4; 350/483, 451

[56] References Cited

U.S. PATENT DOCUMENTS

| | | | |
|---|---|---|---|
| 965,391 | 7/1910 | Little | 126/436 |
| 1,302,363 | 4/1919 | Graham | 126/427 X |
| 3,236,294 | 2/1966 | Thomason | 126/430 X |
| 4,020,989 | 5/1977 | Kautz | 126/427 |
| 4,026,267 | 5/1977 | Coleman | 126/436 |
| 4,050,626 | 9/1977 | Awalt, Jr. | 126/427 |
| 4,059,626 | 11/1977 | Atkinson | 126/427 |
| 4,198,953 | 4/1980 | Power | 126/430 X |
| 4,231,351 | 11/1980 | Pheils, Jr. | 126/427 |
| 4,258,698 | 3/1981 | Sales | 126/440 |
| 4,265,224 | 5/1981 | Meyer | 126/440 X |
| 4,280,482 | 7/1981 | Nilson, Sr. | 126/430 |

*Primary Examiner*—Samuel Scott
*Assistant Examiner*—Randall L. Green
*Attorney, Agent, or Firm*—Kokjer, Kircher, Bradley, Wharton, Bowman & Johnson

[57] ABSTRACT

A subterranean furnace contains a shell in which a plurality of bricks are arranged in a mass. A mirror reflects sun light into the furnace chamber and onto a magnifying glass which concentrates the heat on the bricks. Air is circulated through the furnace chamber and is heated by the heat which is stored in the bricks. A gas burner is mounted beneath the mass of bricks to supply supplemental heat when needed.

8 Claims, 3 Drawing Figures

SOLAR HEATING SYSTEM

BACKGROUND AND SUMMARY OF THE INVENTION

This invention relates generally to heating apparatus and deals more particularly with a solar heating system having improved heat storage and a back-up burner for supplemental heating.

One of the principal problems associated with all solar energy systems is their lack of capability to supply adequate energy at times when there is a prolonged lack of sunshine, i.e., during extended periods of cloudiness. In the past, it has not been possible to economically store enough energy to compensate for the cloudy periods which inevitably occur in most areas. Consequently, it has been necessary to provide a conventional furnace for heating on those days when the solar heating system is unable to supply sufficient heat. This results in the need for a complete conventional furnace system and associated duct work in addition to the solar heater, and the equipment costs are prohibitive. Furthermore, the conventional furnace must operate more than is desirable due to the lack of effective storage of the heat which is derived from the solar heater.

It is the primary object of the present invention to provide a solar heating system which is constructed and arranged to store heat more effectively than the systems which have been proposed in the past.

Another object of the invention is to provide a solar heating system having a back up burner which is incorporated directly into the system in order to supply supplemental heat when needed. Incorporation of the back up burner directly into the solar heating system makes possible the use of common components such as duct work and blowers. As a result, there is no need for a separate complete furnace system to provide back up heating capacity, and the equipment costs are reduced accordingly.

Yet another object of the invention is to provide a solar heating system which is improved in its ability to effectively collect and extract heat. A controlled mirror serves to reflect sunbeams into the furnace and onto a large magnifying glass which concentrates the heat on a mass of bricks located within the furnace.

An additional object of the invention is to provide a solar heating system which is simple and economical to construct and install and which lends itself to connection with conventional duct work.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith and in which like reference numerals are used to indicate like parts in the various views.

Figure 1:
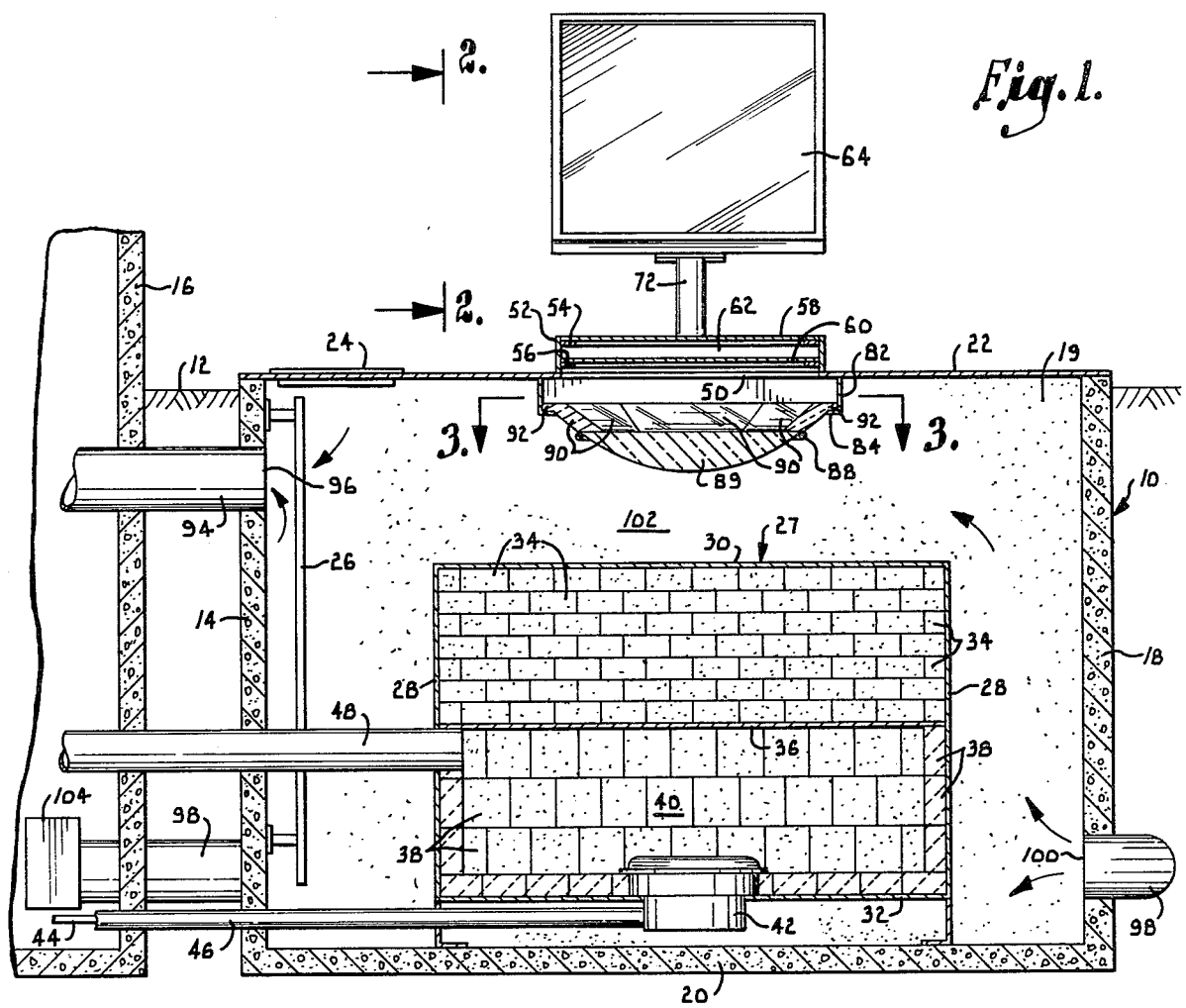
FIG. 1 is a fragmentary sectional view taken on a vertical plane through the furnace compartment of a heating system constructed in accordance with a preferred embodiment of the present invention.

With initial reference to FIG. 1, numeral 10 generally designates a furnace which is recessed below the ground level 12. An inner concrete side wall 14 of the furnace is spaced a short distance outwardly of one of the side walls 16 of the building which is to be heated. An opposite or outer concrete side wall 18 is spaced outwardly of wall 14, and two additional concrete walls 19 extend between walls 14 and 18 to define a rectangular chamber within the furnace compartment. A concrete bottom panel 20 forms the bottom of the furnace.

The top of the furnace is covered by a horizontal top panel 22 located at or sightly above the ground level 12. Access to the interior of the furnace chamber is provided by a manhole opening in panel 22 which is normally closed by a manhole cover 24. A ladder 26 is mounted to the side wall 14 at a location below the manhole. In a preferred form of the invention, the furnace chamber is approximately 6 feet deep, 15 feet long and 10 feet wide. It is preferably located on the south side of the building in order to be exposed to the sun during the winter months. The concrete walls insulate the furnace to minimize the heat loss.

Mounted within furnace 10 is a metal shell 27 having four side walls 28, a top panel 30 and a bottom panel 32. The shell 27 is gas tight and may be constructed of sheet metal or any other suitable substance having good heat conductive properties. The lower ends of the side panels 28 engage the bottom panel 20 of the furnace. The bottom panel 32 of the shell is spaced above the bottom of the furnace. The side panels 28 are spaced well inwardly of the sides of the furnace, while the top panel 30 is spaced well below the top of the furnace. Shell 27 is preferably located centrally on floor panel 20.

A plurality of bricks 34 are arranged in a mass within the top portion of shell 27. The bricks are located on top of a horizontal partition 36 which extends between the side walls of the shell at a location intermediate their heights. As an alternative to the bricks, concrete blocks or any other suitable elements having good heat retaining characteristics may be employed.

The inner surfaces of the side walls of the shell and the upper surface of bottom panel 32 are lined by bricks 38 or other heat retaining elements. An open cavity 40 is presented within the lower portion of the shell below partition 36 in order to provide a combustion chamber for a conventional gas burner 42. The burner is mounted to bottom panel 32 of the shell and has a gas line 44 leading to it concentrically within an air supply conduit 46. Line 44 connects with a source of gas, while conduit 46 is open at its inner end in order to permit air to be drawn through it and delivered to burner 42 for combustion purposes. The open end of conduit 46 is located within the building.

The combustion gases from burner 42 are exhausted from cavity 40 through an exhaust pipe 48 which connects at one end with cavity 40. The exhaust pipe 48 extends through the side wall 14 of the furnace and also through the building wall 16 and connects with a chimney or flue (not shown) in order to deliver the combustion gases thereto.

The top panel 22 of the furnace has a central rectangular opening 50 through which sunbeams may pass into the furnace. Surrounding opening 50 is an upstanding flange 52 having a pair of vertically spaced lips 54 and 56 projecting inwardly therefrom. The lips 54 and 56 support respective transparent panels 58 and 60 which are spaced apart from one another by an air pocket 62. Each of the panels 58 and 60 is constructed of glass or another transparent insulating material. The air pocket 62 provides additional insulation which impedes the leakage of heat out of the furnace.

Figure 2:
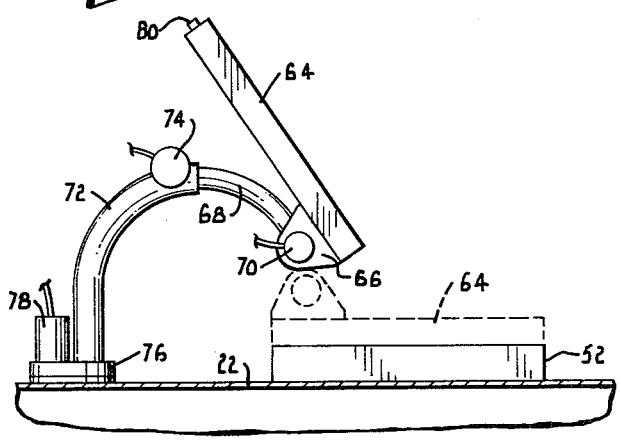
FIG. 2 is a fragmentary view taken generally along line 2—2 of FIG. 1 in the direction of the arrows.

A mirror 64 is mounted on top of the furnace in order to reflect sunlight toward the glass panels 58 and 60. As best shown in FIG. 2, mirror 64 is provided with lugs 66 which are connected with a curved mounting arm 68 for pivotal movement about a horizontal axis. A conventional electric motor 70 serves to pivot mirror 64 on arm 68 about a horizontal axis. The mounting arm 68 is received in a curved tube 72 and is extensible and retractable relative to the tube. A conventional electric motor 74 acts through a suitable drive mechanism (not shown) to extend and retract arm 68.

The lower end of tube 72 connects with a base 76 which is mounted on panel 22 in a manner to rotate about a vertical axis. A conventional electric motor 78 effects rotation of the base in order to rotate the mirror.

The operation of the electric motors 70, 74 and 78 is controlled by a photoelectric sensing device 80 mounted on top of mirror 64. The control arrangement is conventional and functions in a well known manner to maintain the reflective surface of mirror 64 facing in a direction to reflect maximum sunlight toward panels 58 and 60 at all times. The photoelectric sensing device 80 is aimed in a direction oriented at 45° to the reflective surface of the mirror and controls the motors such that device 80 is maintained to always directly receive the sunlight. In this manner, mirror 64 tracks the sun across the sky and is continually maintained in an orientation to reflect the maximum amount of light and heat toward the glass panels 58 and 60. At night, mirror 64 is maintained in the position shown in broken lines in FIG. 2 wherein it covers opening 50 to prevent heat loss.

Figure 3:
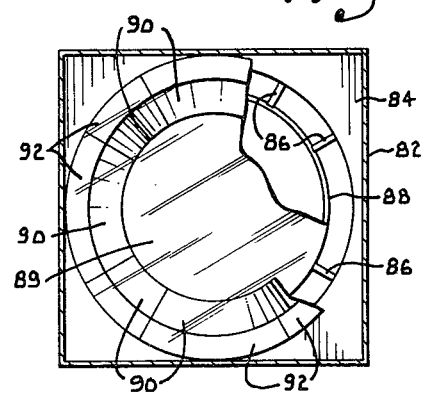
FIG. 3 is a fragmentary sectional view taken generally along line 3—3 of FIG. 1 in the direction of the arrows, with portions broken away for illustrative purposes.

A metal band 82 extends downwardly from panel 22 at a location slightly outwardly of opening 50. The lower edge of band 82 is provided with an inturned flange 84 having a generally circular inside edge portion. Extending inwardly and downwardly from the edge of flange 84 are a plurality of spaced apart bars 86 (FIG. 3) which carry a ring 88 at their lower ends. A magnifying glass 89 is mounted on ring 88 such that the periphery of the magnifying glass rests on top of the ring. A plurality of small lens elements 90 extend upwardly and outwardly at an angle from a flat shoulder formed on the periphery of the magnifying glass 89. The lens elements 90 are supported on glass 89 and on bars 86 and have lips 92 at their upper portions which rest on top of flange 84 to provide additional support. The magnifying glass 89 is located centrally above shell 27 and is spaced therefrom.

Heated air is delivered from furnace 10 to the area which is to be heated through a conduit 94 having an open end 96 located adjacent the inner wall 14 of the furnace. Conduit 94 extends through the building wall 16 to connection with conventional duct work (not shown) which delivers the heated air to registers located in the various rooms of the structure. Air which is to be heated by the furnace is delivered thereto through a return conduit 98 which connects with conventional duct work (not shown) that extends from one or more return registers. The return conduit 98 extends through wall 16 and beneath the ground around furnace 10, extending into the furnace through the outer wall 18. Conduit 98 has an end 100 located adjacent to wall 18 such that shell 27 is located between the conduit ends 100 and 96. An air space 102 is presented within furnace 10 exteriorly of shell 27 to accommodate a flow of air passing between conduits 98 and 94. A conventional blower or fan 104 forces air to flow through conduit 98 and space 102 into the return conduit 94, as indicated by the directional arrows in FIG. 1. In operation of the furnace, the rays which encounter mirror 64 are reflected through the glass panels 58 and 60 toward the magnifying glass 89. The magnifying glass serves as a lens which focuses or concentrates the heat of the sun on the bricks 34 contained within shell 27, thereby heating the bricks. The air which is forced out of end 100 of the return conduit 98 passes through space 102 and adjacent shell 27, thereby effecting heating of the air before it enters conduit 94 for delivery to the area that is to be heated. The lenses 90 mounted on the peripheral shoulder of magnifying glass 89 assist in focusing the heat on shell 27. The bricks 34 retain heat for an extended period of time so that they continue to heat the circulating air at night and at other times when there is little or no sun light entering the unit. The use of bricks or other elements having good heat retention characteristics thus provides improved heat storage capacity for the system, and there is ordinarily no need for supplemental heat.

If there are occasions when the solar energy fails to provide sufficient heat, burner 42 may be operated to burn gas within cavity 40 in order to provide supplemental heat to the bricks 34. Since the same duct work is used for the solar heating system and for distributing the heat generated by burner 42, there is no need for a complete back up furnace system, and the equipment costs are reduced considerably in comparison to systems requiring a complete back up furnace system.

Location of the furnace beneath the ground level 12 increases the efficiency of the system because the subterranean region is warmer than the above ground region during the winter. Therefore, the relatively high temperatures surrounding furnace 10 provide natural insulation which minimizes the heat loss from the furnace.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

I claim:
1. Heating apparatus comprising:
   a plurality of walls located beneath the ground surface and defining therebetween an enclosed chamber located remotely of an area to be heated;
   a substantially enclosed shell in said chamber spaced inwardly of said walls to provide a space in the chamber exteriorly of said shell for accommodating air to be heated;
   a plurality of heat retaining elements arranged in a mass in said shell, said elements being adapted to retain heat;

an air tight cavity located immediately beneath said heating retaining elements;

a transparent panel on said chamber located to direct sun beams into the chamber;

lens means for concentrating the sun beams passing through said panel onto said shell for heating of said heat retaining elements;

a burner in said cavity operable to selectively apply supplemental heat to said shell to heat said heat retaining elements;

an exhaust conduit communicating with said caivty for exhausting the combustion gases of the burner;

a cold air return conduit communicating at one end with the area to be heated and at the other end with said space to deliver return air thereto;

a hot air delivery conduit communicating at one end with said space and at the other end with the area to be heated to deliver hot air thereto; and means for effecting passage of air through said return conduit and said space to said delivery conduit to direct hot air to the area to be heated.

2. A heating apparatus comprising:

a plurality of walls providing a substantially enclosed chamber beneath the ground surface at a location remote from an area to be heated;

a substantially enclosed shell disposed in said chamber and having walls spaced inwardly of the walls of said chamber to provide a space for passage of air to be heated between the shell walls and chamber walls;

a plurality of heat retaining elements arranged in a mass within said shell, each of said elements being constructed of a material adapted to retain heat;

a cavity presented within said shell adjacent the bottom thereof at a location beneath said heat retaining elements;

a transparent panel constructed of an insulating material and located adjacent an upper portion of said chamber at a position wherein the panel is exposed to the sun to direct sun beams into the chamber;

a magnifying glass supported within said chamber beneath said transparent panel at a location to receive the sun beams passing through the panel, said magnifying glass concentrating the beams on said mass of heat retaining elements for heating of same;

a burner mounted in said cavity and operable to burn fuel for supplemental heating of said heat retaining elements;

an exhaust conduit communicating with said cavity and extending out of said chamber to exhaust the combustion gases of said burner;

a cold air return conduit extending from the area to be heated to said chamber to deliver air thereto;

a hot air delivery conduit extending from said chamber to the area to be heated to deliver hot air thereto; and means for passing air through said return conduit and chamber to said delivery conduit for delivery to the area to be heated, whereby the air passing through said chamber is heated by the heat retaining elements prior to entering said delivery conduit.

3. Apparatus as set forth in claim 2, wherein said heat retaining elements comprise bricks.

4. Apparatus as set forth in claim 2, wherein said return conduit connects with said chamber at a location remote from the area to be heated and said delivery conduit connects with said chamber at a location in proximity to the area to be heated, said mass of heat retaining elements being located intermediate the chamber whereby air passing through the chamber from said return conduit to said delivery conduit encounters said mass.

5. Apparatus as set forth in claim 2, including a second transparent panel spaced below the first mentioned panel and separated therefrom by an air space, said second panel being constructed of an insulating material.

6. Apparatus as set forth in claim 2, wherein said magnifying glass is a circular lens member having a curved surface and a circular periphery, and including a plurality of lens elements on the periphery of said lens member oriented to extend outwardly and upwardly therefrom.

7. Apparatus as set forth in claim 2, including:

a second transparent panel spaced between the first mentioned panel and said magnifying glass, said second panel being constructed of an insulating material and being separated from the first mentioned panel by an air space;

a mirror mounted above said panels to reflect sun beams toward same; and means for controlling the orientation of said mirror such that the sun beams encountering same are reflected toward said panels and said magnifying glass.

8. Heating apparatus comprising:

an enclosed chamber defined between walls located beneath the ground surface remote from an area to be heated;

a substantially enclosed shell disposed in said chamber and defined within walls spaced inwardly of the walls of said chamber to provide a space for passage of air to be heated between the shell walls and chamber walls, said shell presenting a cavity adjacent the bottom thereof;

a mass of heat retaining material in said shell above said cavity;

a transparent panel located adjacent an upper portion of said chamber at a position to direct sun beams into the chamber;

lens means for concentrating the sum beams passing through said panel onto said mass of heat retaining material for heating of same;

supplemental heating means in said cavity operable to generate heat for supplemental heating of said mass of heat retaining material;

a cold air return conduit extending from the area to be heated to said space to deliver air thereto;

a hot air delivery conduit extending from said space to the area to be heated to deliver hot air thereto; and means for effecting passage of air through said return and delivery conduits and said space, whereby the air passing through said space is heated prior to entering said delivery conduit.

* * * * *